(12) United States Patent
Peterson et al.

(10) Patent No.: US 11,697,089 B2
(45) Date of Patent: Jul. 11, 2023

(54) PARTICULATE FILTRATION DEVICE, FUEL VAPOR RECOVERY SYSTEM, VEHICLE AND METHOD FOR A PARTICULATE FILTRATION

(71) Applicant: ETO MAGNETIC GmbH, Stockach (DE)

(72) Inventors: Matthew Peterson, Grand Rapids, MI (US); David Savage, Grand Rapids, MI (US)

(73) Assignee: ETO MAGNETIC GmbH, Stockach (DE)

( * ) Notice: Subject to any disclaimer, the term of this patent is extended or adjusted under 35 U.S.C. 154(b) by 0 days.

(21) Appl. No.: 17/243,123

(22) Filed: Apr. 28, 2021

(65) Prior Publication Data

US 2022/0347620 A1    Nov. 3, 2022

(51) Int. Cl.
| | |
|---|---|
| *B01D 45/08* | (2006.01) |
| *B01D 50/20* | (2022.01) |
| *B01D 46/10* | (2006.01) |
| *B01D 46/24* | (2006.01) |
| *B60K 15/035* | (2006.01) |

(52) U.S. Cl.
CPC ............. *B01D 50/20* (2022.01); *B01D 45/08* (2013.01); *B01D 46/10* (2013.01); *B01D 46/2403* (2013.01); *B01D 2279/00* (2013.01); *B60K 15/03504* (2013.01); *B60K 2015/03514* (2013.01)

(58) Field of Classification Search
CPC ........ B01D 50/20; B01D 45/08; B01D 46/10; B01D 46/2403; B01D 2279/00; B60K 15/03504; B60K 2015/03514
See application file for complete search history.

(56) References Cited

U.S. PATENT DOCUMENTS

| | | | | |
|---|---|---|---|---|
| 6,004,366 A | * | 12/1999 | Engel ................. | B01D 46/2411 55/498 |
| 7,905,947 B2 | * | 3/2011 | Leseman ................ | B01D 46/10 55/420 |
| 8,657,927 B2 | | 2/2014 | Rockwell et al. | |
| 8,747,523 B2 | * | 6/2014 | Spryshak ........... | B01D 46/0006 55/421 |
| 10,729,998 B2 | * | 8/2020 | Morishita .............. | B01D 45/08 |
| 11,167,237 B2 | * | 11/2021 | Khan ..................... | B01D 50/20 |
| 2011/0252974 A1 | * | 10/2011 | Verdegan ............... | F01M 13/04 96/178 |

(Continued)

*Primary Examiner* — Dung H Bui
(74) *Attorney, Agent, or Firm* — Posz Law Group, PLC (57) ABSTRACT

A particulate filtration device is suggested, comprising an inlet for an inflow of a gas stream which is particle-laden, an outlet for an outflow of the gas stream having a significantly reduced particulate load, a main filter section, which is arranged within a flow path of the gas stream between the inlet and the outlet and which comprises a filtration medium, and a prefilter chamber, which is arranged upstream of the main filter section and which comprises an inertial filter element, having several perforations, wherein the perforations of the inertial filter element are arranged within the flow path of the gas stream in such a way that when the flow path of the gas stream is passing through the perforations, an inertial separation of the particulates from the mean flow path of the gas stream is achieved.

16 Claims, 6 Drawing Sheets

(56) References Cited

U.S. PATENT DOCUMENTS

| | | | |
|---|---|---|---|
| 2011/0284089 A1* | 11/2011 | Knuth | F15B 1/26 |
| | | | 220/501 |
| 2014/0059985 A1* | 3/2014 | Janakiraman | B01D 46/003 |
| | | | 55/459.4 |
| 2019/0078472 A1* | 3/2019 | Tan | F01D 25/32 |
| 2021/0199072 A1* | 7/2021 | Hasumi | B60K 15/03504 |
| 2021/0322911 A1* | 10/2021 | Shelton | B01D 46/62 |
| 2022/0032211 A1* | 2/2022 | Oshinowo | B01D 17/0211 |
| 2022/0212522 A1* | 7/2022 | Skipton | B01D 46/12 |

* cited by examiner

PARTICULATE FILTRATION DEVICE, FUEL VAPOR RECOVERY SYSTEM, VEHICLE AND METHOD FOR A PARTICULATE FILTRATION

STATE OF THE ART

The invention relates to a particulate filtration device, to a fuel vapor recovery system, to a vehicle and to a method for particulate filtration.

From the state-of-the-art fuel recovery systems with particulate filtration devices like the one of US 8,657,927 B2 are known. Often, these particulate filtration devices have complicated and imperfect flow paths, which often have a relatively low flow limit or often include relatively narrow flow paths which may comprise the risk for clogging outside the filtration regions.

The objective of the invention is in particular to provide a method with advantageous characteristics regarding a particulate filtration. The objective is achieved, according to the invention, by the features of the independent patent claims while advantageous implementations and further developments of the invention may be gathered from the subordinate claims.

ADVANTAGES OF THE INVENTION

The invention pertains to a particulate filtration device, comprising an inlet for an inflow of a gas stream which is particle-laden, an outlet for an outflow of the gas stream having a significantly reduced particulate load, a main filter section, in particular a main filter chamber, which is arranged within a flow path of the gas stream between the inlet and the outlet and which comprises a filtration medium, and a prefilter chamber, which in the flow path of the gas stream is arranged upstream of the main filter section, in particular the main filter chamber, and which comprises an inertial filter element, having several perforations.

It is proposed that the perforations of the inertial filter element are arranged within the flow path of the gas stream in such a way that when the flow path of the gas stream is passing through the perforations, an inertial separation of the particulates from the mean flow path of the gas stream is achieved. Thereby advantageous characteristics regarding a particulate filtration can be achieved. In particular, a generic particulate filtration device with a relatively high flow rate and/or a relatively high throughput can advantageously be achieved. In particular, a generic particulate filtration device with a relatively low pressure drop between inlet and the main filter can advantageously be achieved. Furthermore, a high filtration efficiency can be advantageously achieved, in particular because a large fraction of larger particulates is efficiently removed from the gas stream even before they reach the main filter, in turn advantageously reducing the tendency of the main filter to clog and/or the frequency of main filter clogging events. In addition, the proposed filtration device is particularly simple and therefore cost effective. In particular, the perforations could also be seen or denoted as piercings or through-holes.

In particular, the particulate filtration device is configured to remove at least a large fraction of solid or liquid particulates from a gas stream. The gas stream comprises an aerosol, meaning in particular a suspension of fine solid particles or fine liquid droplets in air or in another gas. In a fuel vapor recovery system, a large fraction of the particulates are liquid fuel droplets and/or droplets of condensed volatile organic compounds (VOC). Typically, such droplets have sizes (aerodynamic diameters) of between a few hundred nanometers to few thousand nanometers. The particulates are more or less evenly distributed/suspended in the gas stream. By a "significant reduction of particulate load" preferably a reduction by at least a factor of two, more preferably by at least a factor of three, advantageously by at least a factor of 10 and more advantageously by at least a factor of 25 is to be understood. The main filter section is preferably defined by the main filter element and/or the filtration medium. The main filter section preferably defines a main filter area. The main filter chamber is filled completely or at least almost completely by a main filter element, in particular a passive filter element. Preferably, the main filter element defines the main filter chamber. The main filter element is made from the filtration medium. The filtration medium preferably is a foam-like medium, however, alternative filtration media, like woven or nonwoven fiber etc. are conceivable. The main filter chamber/the main filter section does not necessarily have to be surrounded by walls which are separate from the filtration medium. The surfaces of the filtration medium may form the boundaries of the main filter chamber/the main filter section. A "chamber" in particular is to be understood as an area which may at least partly be encompassed by walls and/or which in the absence of walls to at least one side may be delimited by a surface of a solid medium, for example the filtration medium. Consequently, the main filter chamber may optionally be understood as the area which is covered by the filtration medium The prefilter chamber comprises a prefilter element, which preferably is different in shape and function from a foam filter and/or from a filter that is made from woven or nonwoven fibers. Preferably, the working principle of an "inertial filter element" is based on exploiting the different inertial behavior of particles of different inertial masses. Particles with lower inertial masses are more prone to follow direction changes of a gas flow than particles with higher inertial masses. Thus, if a gas flow that contains particulates undergoes a direction change, the particulates are subject to the force of inertia which makes them follow the direction of the original motion, while the gas molecules will follow the direction change much more quickly and easily. The difference of kinetic energy that the particles with different masses have, helps the separation of the heavier particles from the gas flow. Most of the separated particles subsequently impinge on an inner surface of the prefilter chamber where, also due to their predominantly liquid nature, they typically adhere without rebounding. This process is also called inertial separation. Lighter particles or gaseous compounds like VOCs are less affected by inertial separation and may follow the flow path of the gas stream to the main filter section. Preferably, the inertial filter element is implemented as a metal plate, however alternative embodiments and materials are conceivable. The term "perforation" in particular is to be understood as a hole that goes all the way through an object, like for example a metal plate. In particular, the inertial filter element comprises more than one, preferably more than five, perforations, which are arranged regularly or irregularly over a surface of the inertial filter element. For example, the inertial filter element could comprise several rows and/or several columns of regularly or irregularly spaced perforations.

Furthermore, it is proposed that a mean inflow direction of the gas stream into the prefilter chamber and a mean outflow direction of the gas stream out of the prefilter chamber spans an angle of at least 45° and at most 135°. Hence, a particularly good relation between efficient inertial separation and an as low as possible flow resistance of the flow path can be achieved. In particular, the mean inflow direction and the mean outflow direction are determined by averaging all possible inflow directions at the inlet to the prefilter chamber and all possible outflow directions at the crossover between the prefilter chamber and the main filter chamber/the main filter section, respectively.

In addition, it is proposed that the perforations are arranged within the prefilter chamber and/or within the inertial filter element in a cascading manner. Thereby, a particularly good relation between efficient inertial separation and an as low as possible flow resistance of the flow path can be achieved. In this way, an advantageously large overall flow volume can pass the prefilter chamber per time unit. In particular, the perforations are arranged within the prefilter chamber and relative to the mean inflow direction in a cascade-like arrangement. Preferably, the mean inflow direction is oblique to opening planes of the cascading perforations. In particular, due to the cascade-like arrangement of the perforations, partial flow paths which pass through different neighboring perforations do not mutually effect or hinder each other to a large extent.

Moreover, it is proposed that at least one of the perforations of the inertial filter element is at least sectionally/partially bordered by a deflection element. Thereby the inertial separation effect can advantageously be improved and/or enhanced. The deflection element is preferably made in one piece with the (plate-like) inertial filter element. In particular, the inertial filter element with the perforations and the deflection element are parts of a single sheet metal bending part. However, alternatively it is also conceivable that the deflection element is a separate element that is attached to the inertial filter element having the perforations. Preferably more than one perforation, more preferably each perforation, has its own deflection element. Preferably, all deflection elements and/or all perforations are at least substantially identical. However, for some embodiments, it is possible that the size of the perforations, the orientation of the perforations, the size of the deflection elements and/or the orientation of the deflection elements differs over the inertial filter element. The deflection element is in particular configured to deflect the incoming gas stream, preferably to further deflect the incoming gas stream than just a main body of the inertial filter element. The deflection element is preferably implemented in one piece with the main body of the inertial filter element. The deflection element in particular is implemented as a lug or tab that protrudes from a side of the protrusion in a bent manner, and in particular in a slanted manner relative to the opening plane of the protrusion.

It is further proposed that the deflection element protrudes from the inertial filter element. Thereby the inertial separation effect can advantageously be improved and/or enhanced, in particular by adjusting/increasing the total turn the partial gas flows have to make when passing the inertial filter element. In particular, the total turn of the partial gas flows of each perforation are larger than the angle that is spanned between the mean inflow direction of the overall gas stream and mean outflow direction of the overall gas stream. In particular, the deflection element protrudes from an inertial filter element plane, which is defined by the plate-like inertial filter element. Preferably, the inertial filter element plane corresponds to a main extension plane of the inertial filter element when viewed without the deflection elements. By a "main extension plane" of an object shall be understood in particular a plane which is parallel to a largest side surface of a smallest imaginary cuboid which just completely encloses the construction unit, and in particular runs through the center of the cuboid. In particular, the main extension plane runs parallel to the opening planes of the perforations. In particular, all deflection elements of all perforations protrude from the inertial filter element in the same direction/towards the same side. In particular, the deflection element protrudes from the main extension plane of the inertial filter element by a distance that is more than twice, preferably more than five times, the average material thickness of the inertial filter element.

Additionally, it is proposed that the deflection element protrudes from a side of the inertial filter element that faces away from a (mean) outflow direction of the prefilter chamber. Thereby the inertial separation effect can advantageously be improved and/or enhanced, in particular by adjusting/increasing the total turn the partial gas flows have to make when passing the inertial filter element. In particular, the deflection element protrudes from a side of the inertial filter element that faces towards a (mean) inflow direction to the prefilter chamber.

If in addition the deflection element protrudes from a side of the inertial filter element that faces away from the main filter chamber/the main filter section the inertial separation effect can advantageously be further improved and/or enhanced. In particular, the deflection element protrudes from a side of the inertial filter element that faces towards the inlet of prefilter chamber.

It is further proposed that the deflection element borders the perforation, in particular an outline of the perforation, at least on a side of the perforation that faces towards a (mean) inflow direction of the gas stream, in particular an incoming flow direction of the gas stream directed from the inlet of the prefilter chamber. Thereby the inertial separation effect can advantageously be further improved and/or enhanced. In particular, the deflection element borders at least 10%, preferably at least 15%, more preferably at least 20% and most preferably at least 25% of the full outline of the perforation. In particular, the connection where the deflection element borders the perforation is gas tight and hole-free. In particular, the side of the perforation that faces away from the (mean) flow direction of the gas stream, in particular from the incoming flow direction of the gas stream, is free of any deflection elements. In particular, the sides of the perforation that are to the left and/or the right of the (mean) flow direction of the gas stream, in particular of the incoming flow direction of the gas stream, are at least for the most part free of any deflection elements.

Furthermore, it is proposed that in a top view to the perforation perpendicular to the opening plane of the perforation the deflection element at least partly covers the perforation. Thereby the inertial separation effect can advantageously be further improved and/or enhanced. In particular, the deflection elements are arranged in a way that when viewed from above, they partially block a straight line of sight through the perforations. Preferably, the deflection elements are bent away from the main body of the inertial filter element, wherein in particular the main body of the inertial filter element can be a flat plate or a bent plate (for example a circularly bent plate). In particular, the (tab-like and/or lug-like) deflection elements are bent away from the opening plane of the perforations by less than 90°, preferably by less than 60° and more preferably by less than 45°. In particular, the (tab-like and/or lug-like) deflection elements are bent away from the opening plane of the perforations by more than 15°, preferably by more than 20° and more preferably by less than 25°. Most preferably the (tab-like and/or lug-like) deflection elements are bent away from the opening plane of the perforations by an angle between 25° and 35°. The opening plane of a perforation in particular is defined as a plane that at least substantially contacts the whole outline of a perforation or at least two opposing sides of the whole outline of the perforation. "Partly" shall in particular be understood as at least 80%, preferably as at least 70%, more preferably as at least 60% and advantageously as at most 50%.

It is moreover proposed that the inertial filter element divides the prefilter chamber in a first subchamber and a second subchamber, which apart from a connection via the perforations is completely separated from the first subchamber. Thereby, an effective and complete prefiltration can advantageously be achieved. In particular the edges of the inertial filter element are tightly, in particular gas-tightly, connected/sealed with the walls of the prefilter chamber. In particular, the perforations provide the only possible gas flow connections between the two subchambers.

Additionally, it is proposed that the deflection element is arranged in a way that the gas stream, when flowing from the first subchamber to the second subchamber undergoes an overall deflection larger than 100°, in particular larger than 110°, preferably larger than 120°. Thereby a particularly effective inertial separation can be achieved.

If in a normal operating state, a (mean) inflow direction into the prefilter chamber is non-parallel, advantageously approximately perpendicular, to the direction of (Earth's) gravity, the inertial separation effect can very effectively be supported by the gravitational force. A normal operating state in particular describes a common installation position of the particulate filtration device in a machine, for example in a vehicle, in particular in a vehicle in a ready-to-drive position (for example a driving position of the vehicle on the road).

If alternatively or additionally, in the normal operating state, a (mean) outflow direction out of the prefilter chamber is approximately parallel to the direction of (Earth's) gravity, in particular directed opposite to the attractive gravity force of Earth, the inertial separation effect can very effectively be supported by the gravitational force.

If the inertial filter element is plate-like and/or flat, a particularly simple construction of the particulate filtration device can be achieved.

If on the other hand, the inertial filter element is at least partly circular, in particular if the inertial filter element is being bent into a permanent circular form during manufacturing, a particularly compact design of the particulate filtration device can advantageously be enabled. In particular, in the circular configuration of the inertial filter element, two ends of the inertial filter element meet each other, preferably contact each other. The perforations in particular in this case are arranged around the circumference of the circularly embodied inertial filter element. The perforations in particular in this case provide connections between an outside and an inside of the circularly arranged inertial filter element. Preferably, the circularly arranged inertial filter element forms an inner space, which is in particular configured to encircle at least the main filter element, the main filter section and/or the main filter chamber.

If in this case as already suggested above, the main filter section is at least partly circular and/or if the main filter section is at least partly encompassed by the inertial filter element, the particularly compact design can advantageously be enabled further.

It is further proposed that the main filter section/the main filter chamber at least on a side of the filtration medium which faces away from the inertial filter element is delimited by a slitted inner support wall. Thereby ideal flow conditions and/or flow paths can advantageously be designed. The support wall is preferably configured to support the filtration medium and/or to hold the filtration medium in place, in particular relative to the inertial filtration element. In particular, the support wall and/or the main filtration medium have a circular, preferably pipe-like shape.

If a distance between two neighboring slits of the slitted inner support wall becomes smaller the further away the slits are from an inlet of the prefilter chamber, in particular from the inlet, advantageous flow characteristics can be achieved. In particular, a pressure drop between both sides of the main filter element can advantageously be equalized over most of the circular structure.

In addition, a fuel vapor recovery system with the particulate filtration device, in particular with a canister vent solenoid comprising the particulate filtration device, and a vehicle, in particular an at least partly gasoline powered vehicle, with the fuel vapor recovery system are proposed. Thereby a highly effective filtration, in particular prefiltration of particulates before the charcoal canister can be achieved. A canister vent solenoid in particular is a part of a fuel vapor recovery system, like an evaporation emission control (EVAP) system, which main purpose it is to prevent environmentally harmful leaks of fuel systems by hindering gasoline vapors from escaping the fuel system and entering the atmosphere.

Moreover, a method for a particulate filtration using the particulate filtration device, in particular within a fuel vapor recovery system, wherein an inertial prefiltering of a particulate-laden gas stream is performed before a fine filtration of the gas stream is performed via a filtration medium, is proposed. Thereby advantageous characteristics regarding a particulate filtration, like a high flow rate and/or a high filtration efficiency can be achieved, while costs advantageously can be kept low.

The particulate filtration device according to the invention, the fuel vapor recovery system according to the invention, the vehicle according to the invention and the method for a particulate filtration according to the invention are herein not to be restricted to the applications and implementation forms described above or pictured below. In particular, to fulfill a functionality herein described, the particulate filtration device according to the invention, the fuel vapor recovery system according to the invention, the vehicle according to the invention and the method for a particulate filtration according to the invention may comprise a number of respective elements and/or structural components and/or units and/or method steps that differ/s from a number herein mentioned. The features that are described in the dependent claims are combinable at will, as long as this does not result in any contradictions.

DRAWINGS

Further advantages will become apparent from the following description of the drawings. In the drawings, three exemplary embodiments of the invention are depicted. The drawings, the description and the claims contain a plurality of features in combination. Someone skilled in the art will purposefully also consider the features separately and will find further expedient combinations.

It is shown in.

DESCRIPTION OF THE EXEMPLARY EMBODIMENTS

Figure 1:
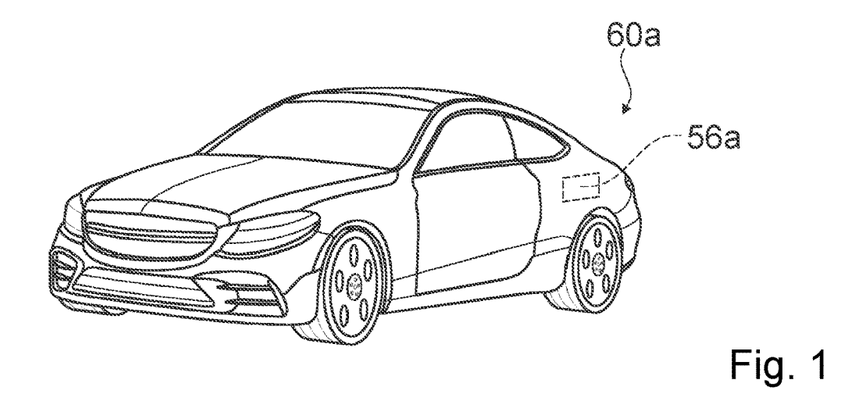
FIG. 1: a schematical view of a vehicle with a fuel vapor recovery system.
Figure 2:
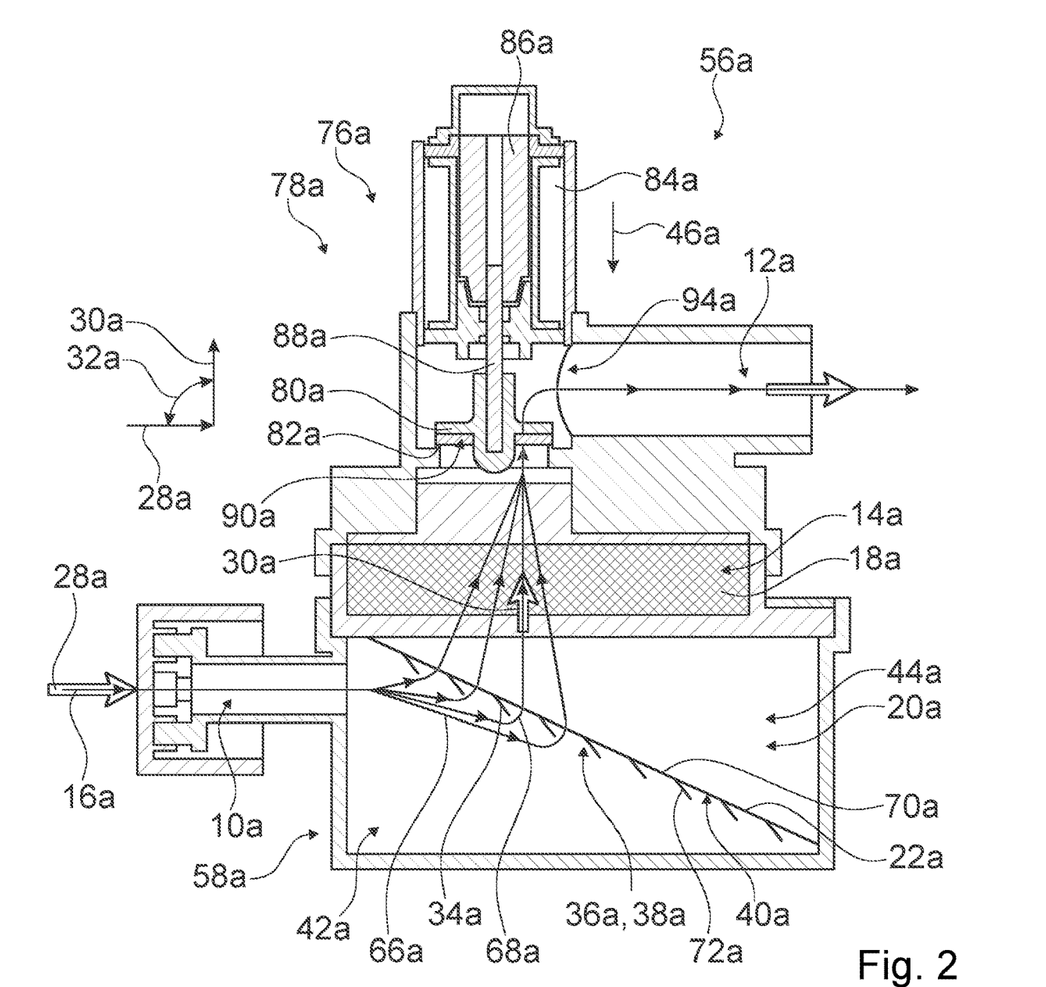
FIG. 2: a schematical sectional view of a part of the fuel vapor recovery system with a particulate filtration device.

The FIG. 1 shows schematically a vehicle 60a with a fuel vapor recovery system 56a according to the invention. The FIG. 2 shows a schematical sectional view of a part of the fuel vapor recovery system 56a. The fuel vapor recovery system 56a comprises a particulate filtration device 58a. In a normal operating state, the particulate filtration device 58a has a fixed orientation relative to the direction of Earth's gravity 46a (as it is for example shown in FIG. 2). The FIG. 2 shows a schematical sectional view of the particulate filtration device 58a. The particulate filtration device 58a comprises an inlet 10a for an inflow of a gas stream, in particular an aerosol stream which is particle-laden, to the particulate filtration device 58a. The gas stream that enters the inlet can for example come from a fuel tank (not depicted) of the vehicle 60a. The particulate filtration device 58a comprises an outlet 12a for an outflow of the gas stream having a significantly reduced particulate load compared to the particulate load at the inlet 10a. The gas stream that leaves the particulate filtration device 58a from the outlet 12a can for example be passed on to a charcoal canister (not depicted) of the vehicle 60a.

The particulate filtration device 58a comprises a prefilter chamber 20a. The inlet 10a of the particulate filtration device 58a forms at the same time an inlet 10a to the prefilter chamber 20a. The particulate filtration device 58a comprises a main filter section 14a. The main filter section 14a is implemented as a main filter chamber which is at least partly defined by side walls. The main filter section 14a comprises a filtration medium 18a, like a filter foam. The main filter section 14a is arranged within a flow path 16a of the gas stream between the inlet 10a and the outlet 12a. The main filter section 14a is arranged in the flow path 16a downstream of the prefilter chamber 20a. The outlet 12a of the particulate filtration device 58a is different from an outlet of the main filter section 14a/the main filter chamber. The prefilter chamber 20a is arranged in the flow path 16a upstream of the main filter section 14a. The prefilter chamber 20a, in particular an inertial filter element 22a within the prefilter chamber 20a, is configured to prefilter the particulate-laden gas stream flowing in from the inlet 10a. The prefilter chamber 20a, in particular the inertial filter element 22a within the prefilter chamber 20a, is configured to remove particles, in particular coarse particles, from the gas stream. The filtration medium 18a of the main filter section 14a is configured to remove fine particles from the gas stream.

The inlet 10a defines a mean inflow direction 28a to the prefilter chamber 20a. The mean inflow direction 28a into the prefilter chamber 20a in the normal operating state is non-parallel to the direction of Earth's gravity 46a. The mean inflow direction 28a into the prefilter chamber 20a in the normal operating state is approximately perpendicular to the direction of Earth's gravity 46a. The prefilter chamber 20a is physically connected and flow-connected with the main filter section 14a/the main filter chamber. The prefilter chamber 20a and the main filter section 14a are arranged side-by-side. In the normal operating state, the main filter section 14a is located on top (when viewed in the Direction of Earth's gravity 46a) of the prefilter chamber 20a. The prefilter chamber 20a is surrounded by closed walls except in the connection region towards the main filter section 14a, wherein the walls of the prefilter chamber 20a comprise openings 130a (see FIG. 3), which allow the gas stream to flow from the prefilter chamber 20a into the main filter section 14a/the main filter chamber. The gas stream leaves the prefilter chamber 20a along a mean outflow direction 30a. The gas stream enters the main filter section 14a from a direction that is equivalent to the mean outflow direction 30a of the prefilter chamber 20a. In the normal operating state, the mean outflow direction 30a out of the prefilter chamber 20a is approximately parallel to the direction of Earth's gravity 46a. In the normal operating state, the flow direction into the main filter section 14a is approximately parallel to the direction of Earth's gravity 46a. The mean inflow direction 28a of the gas stream into the prefilter chamber 20a and the mean outflow direction 30a of the gas stream out of the prefilter chamber 20a spans an angle 32a of at least 45° and at most 135°. In the exemplary embodiment of FIG. 2 the angle between the mean inflow direction 28a of the gas stream into the prefilter chamber 20a and the mean outflow direction 30a of the gas stream out of the prefilter chamber 20a is about 90°.

The prefilter chamber 20a comprises the inertial filter element 22a. The inertial filter element 22a is arranged completely within the prefilter chamber 20a. The inertial filter element 22a extends between opposite inner walls of the prefilter chamber 20a. In the embodiment of FIG. 2 the inertial filter element 22a has a plate-like shape. The inertial filter element 22a divides the prefilter chamber 20a in a first subchamber 42a and a second subchamber 44a. The second subchamber 44a is completely separated from the first subchamber 42a, apart from connections via perforations 24a, 26a (see FIG. 3) within the inertial filter element 22a. All lateral edges 62a (see FIG. 3) of the inertial filter element 22a contact the inner walls of the prefilter chamber 20a. All lateral edges 62a (see FIG. 3) of the inertial filter element 22a gas-tightly and/or leak-tightly contact the inner walls of the prefilter chamber 20a. The inertial filter element 22a is configured to perform an inertial separation of at least the coarse particles from the gas stream. The inlet 10a is connected to the first subchamber 42a. The inlet 10a opens towards the first subchamber 42a. The openings 130a, which connect the prefilter chamber 20a and the main filter section 14a/the main filter chamber are connected to the second subchamber 44a. The openings 130a, which connect the prefilter chamber 20a and the main filter section 14a/the main filter chamber open towards the second subchamber 44a.

Figure 3:
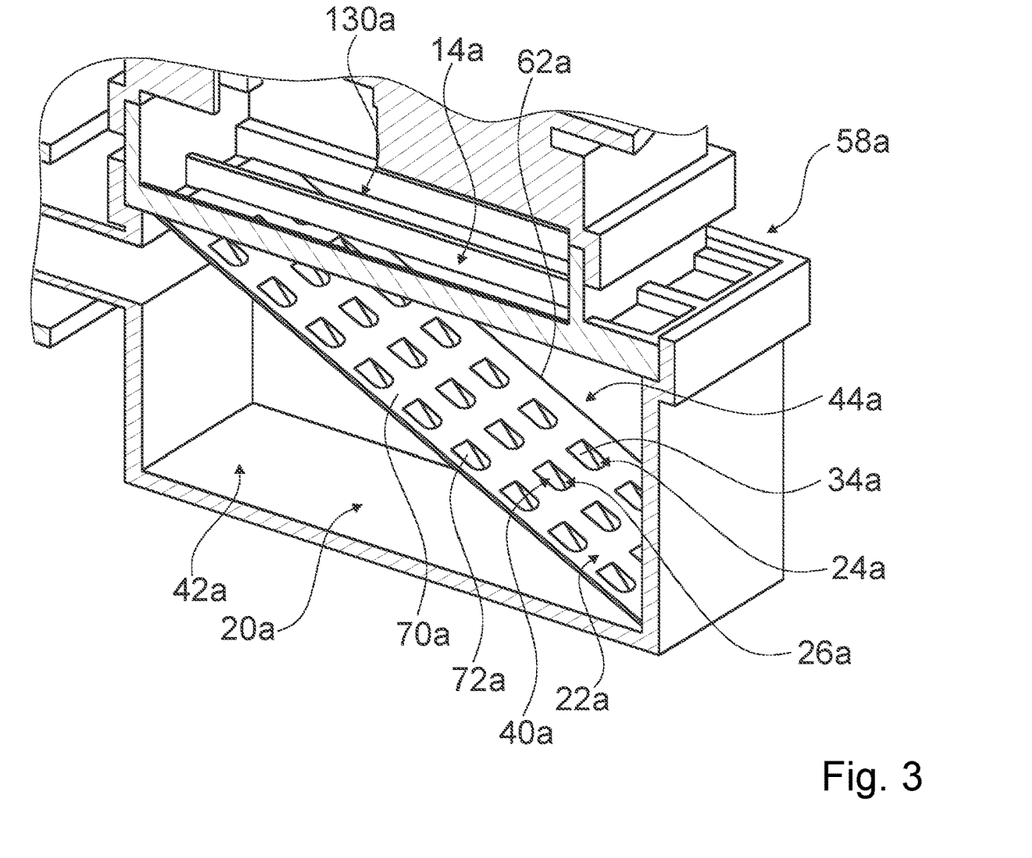
FIG. 3: a schematical sectional and perspective view of the part of the fuel vapor recovery system with a particulate filtration device.
Figure 4:
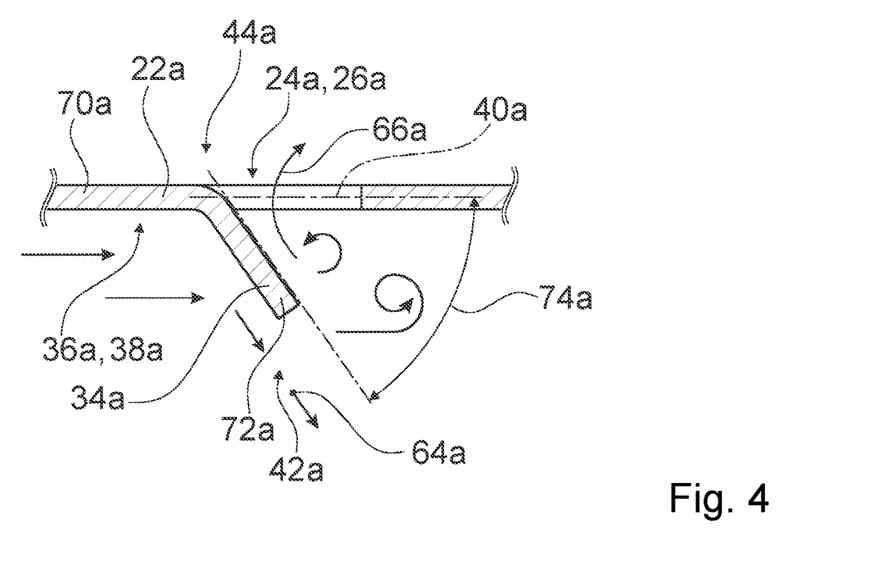
FIG. 4: a schematical sectional view of a part of an inertial filter element of the particulate filtration device.

The inertial filter element 22a has several perforations 24a, 26a. The perforations 24a, 26a of the inertial filter element 22a are arranged within the flow path 16a of the gas stream in such a way that when the flow path 16a of the gas stream is passing through the perforations 24a, 26a, the inertial separation of particulates 64a (see also FIG. 4) from the mean flow path 16a of the gas stream is achieved. The perforations 24a, 26a are arranged within the prefilter chamber 20a in a cascading manner. Each perforation 24a, 26a provides a partial flow path 66a, 68a of the flow path 16a. The inertial filter element 22a is arranged within the prefilter chamber 20a in a slanted or oblique manner relative to the direction of Earth's gravity 46a, relative to the mean inflow direction 28a of the prefilter chamber 20a and/or relative to the mean outflow direction 30a of the prefilter chamber 20a. The inertial filter element 22a fills the prefilter chamber 20a diagonally. The inertial filter element 22a fills the prefilter chamber 20a diagonally between diagonally opposing corners/edges of the prefilter chamber 20a.

The perforations 24a, 26a of the inertial filter element 22a are each sectionally bordered by deflection elements 34a. The deflection elements 34a are arranged in a way relative to the gas stream that the gas stream, when flowing from the first subchamber 42a to the second subchamber 44a undergoes an overall deflection larger than 100°. The deflection elements 34a are arranged in a way relative to the gas stream that the gas stream, when flowing from the first subchamber 42a to the second subchamber 44a undergoes an overall deflection of about 125°. The deflection elements 34a protrude from the inertial filter element 22a. The deflection elements 34a protrude from a side 36a of the inertial filter element 22a that faces away from the outflow direction 30a of the prefilter chamber 20a. The deflection elements 34a protrude from the side 36a of the inertial filter element 22a that faces away from the main filter section 14a. The deflection elements 34a border the perforations 24a, 26a on sides 38a of the perforations 24a, 26a that face towards the mean inflow direction 28a of the gas stream. In the exemplary embodiment of FIGS. 2 and 3, the inertial filter element 22a comprises a main body 70a and tabs 72a. The tabs 72a form the deflection elements 34a. The deflection elements 34a are embodied as tabs 72a which are bent away from the main extension plane of the plate-like main body 70a of the inertial filter element 22a. The deflection elements 34a are embodied as stamped out and (in the direction of the first subchamber 42a) downwardly bent tabs 72a. The deflection elements 34a are at least substantially flat.

In a top view to the perforations 24a, 26a perpendicular to an opening plane 40a of the perforations 24a, 26a, the deflection elements 34a at least partly cover the respective perforations 24a, 26a. The tab-like deflection elements 34a and the opening plane 40a of the perforations 24a, 26a span an angle 74a, which is about 27° in the exemplary embodiment of FIGS. 2 and 4. The partial flow paths 66a, 68a pass around the deflection elements 34a and through the perforations 24a, 26a.

The fuel vapor recovery system 56a comprises a canister vent solenoid 76a. The canister vent solenoid 76a comprises a poppet valve device 78a. The poppet valve device 78a is arranged in the flow path 16a between the main filter section 14a and the outlet 12a. The poppet valve device 78a is configured to block or unblock the flow path 16a by controlling the position of a poppet 80a of the poppet valve device 78a relative to a valve seat 82a of the poppet valve device 78a. When the poppet 80a sits tightly on the valve seat 82a, the flow path 16a is blocked. When the poppet 80a is removed from the valve seat 82a, the flow path 16a is open. The poppet valve device 78a is mainly used for regular leak checks of the fuel vapor recovery system 56a. The poppet valve device 78a comprises a magnetic coil 84a, a magnetic anchor 86a and a valve stem 88a for the actuation of the poppet 80a. The magnetic coil 84a and the magnetic anchor 86a form an electromagnetic actuator, in particular a reluctance magnet. The main filter section 14a/the main filter chamber has an opening, which opens towards a valve inlet 90a of the poppet valve device 78a. The poppet valve device 78a has a valve outlet 94a, which opens towards the outlet of the particulate filtration device 58a.

Figure 5:
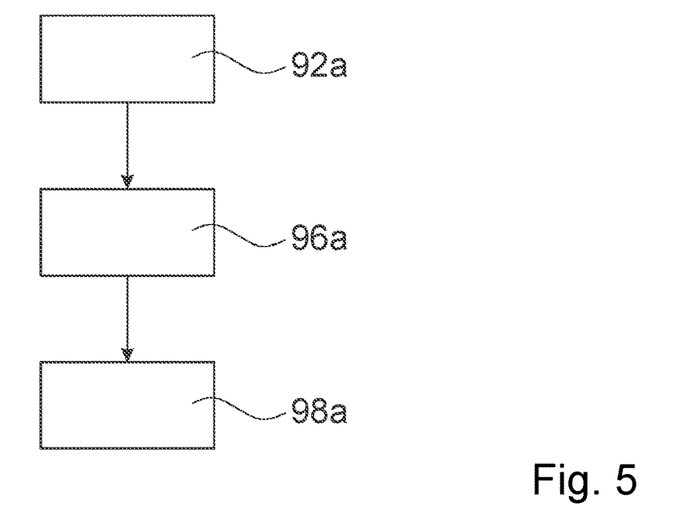
FIG. 5: a schematic flow diagram of a method for a particulate filtration using the particulate filtration device.

FIG. 5 shows a schematic flow diagram of a method for a particulate filtration using the particulate filtration device 58a, in particular within the fuel vapor recovery system 56a. In at least one method step 92a a particle-laden gas stream is prefiltered using an inertial separation method. In the method step 92a the gas stream is guided through the perforations 24a, 26a of the inertial filter element 22a, which is arranged in a way within the prefilter chamber 20a that the gas stream, when flowing from the first subchamber 42a of the prefilter chamber 20a to the second subchamber 44a the prefilter chamber 20a undergoes an overall deflection larger than 100°. At the same time the angle between the mean inflow direction 28a and the mean outflow direction 30a is smaller than 100°. In at least one further method step 96a that takes place after the prefiltering method step 92a, a fine filtration of the gas stream is performed by passing the prefiltered gas stream through the filtration medium 18a. In at least one further method step 98a, the gas stream, which was prefiltered for the coarse particles and then filtered for the fine particles is passed through a charcoal container, which further removes volatile/gaseous compounds like VOCs.

Figure 6:
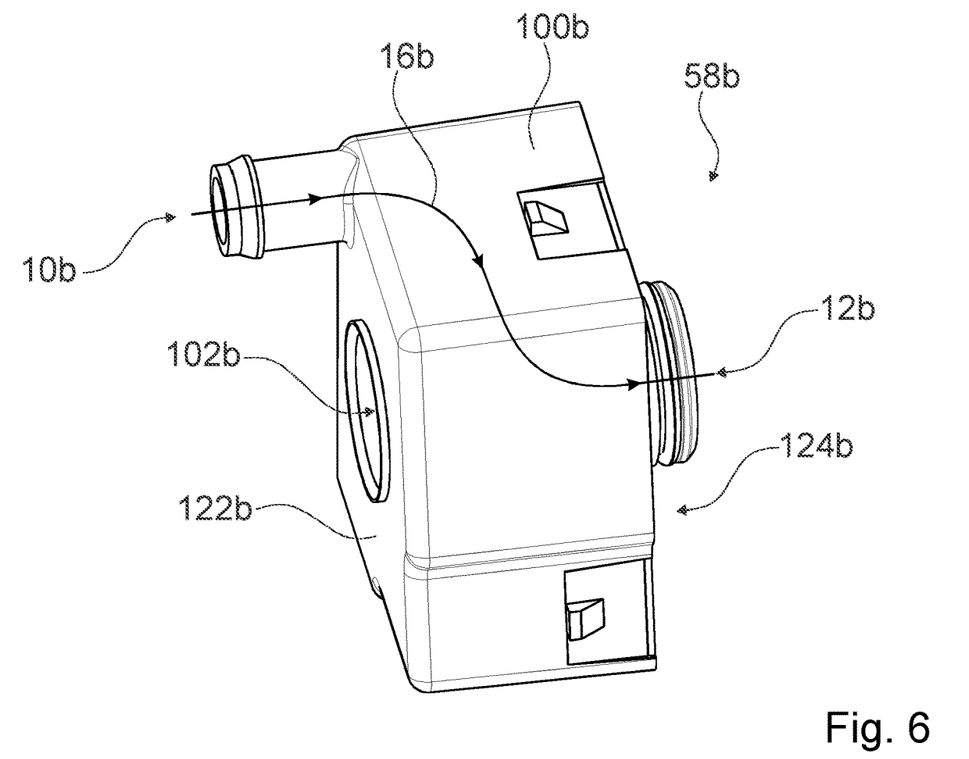
FIG. 6: a schematic perspective view of an alternative particulate filtration device.
Figure 7:
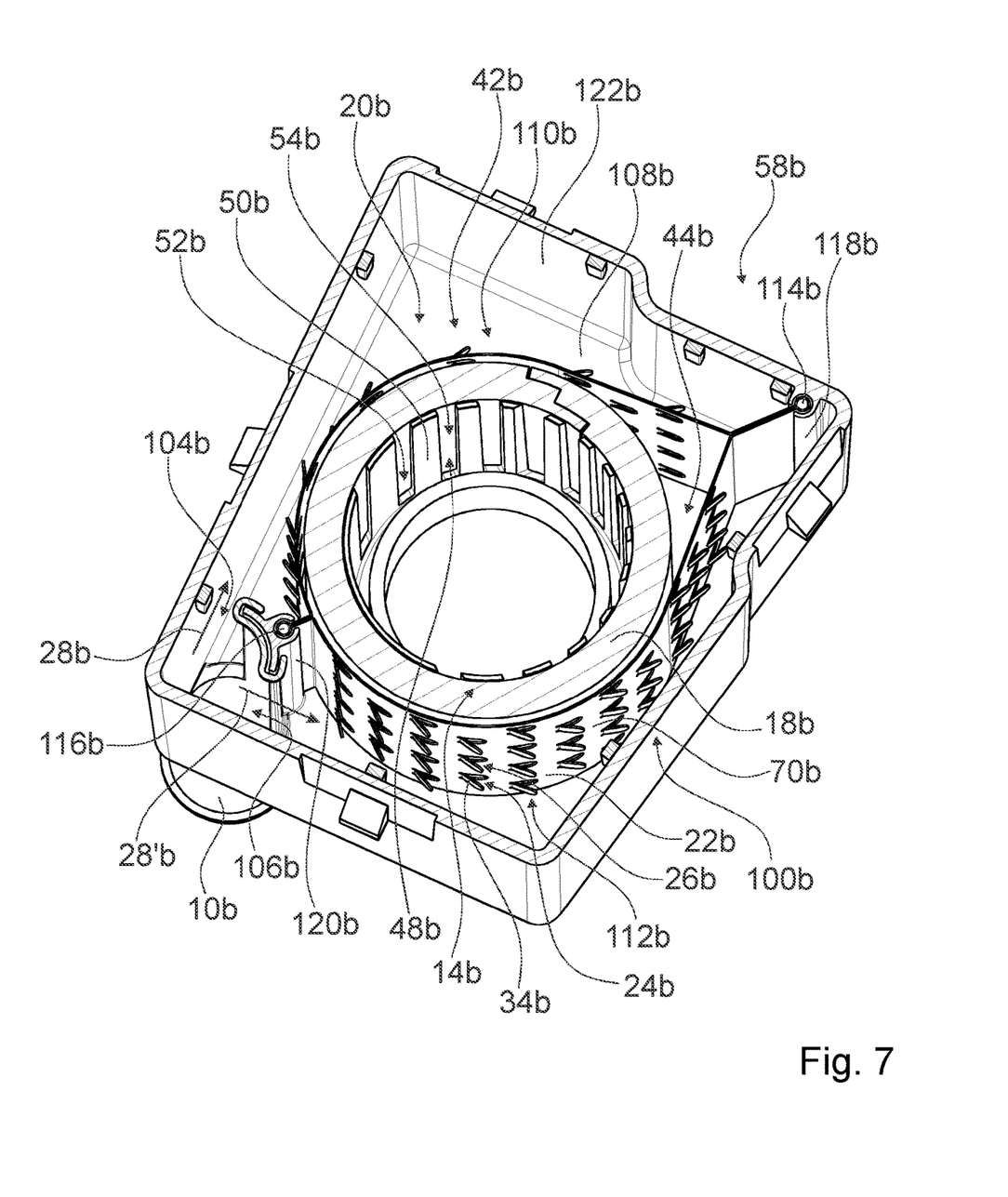
FIG. 7: a schematic sectional view of the alternative particulate filtration device.
Figure 8:
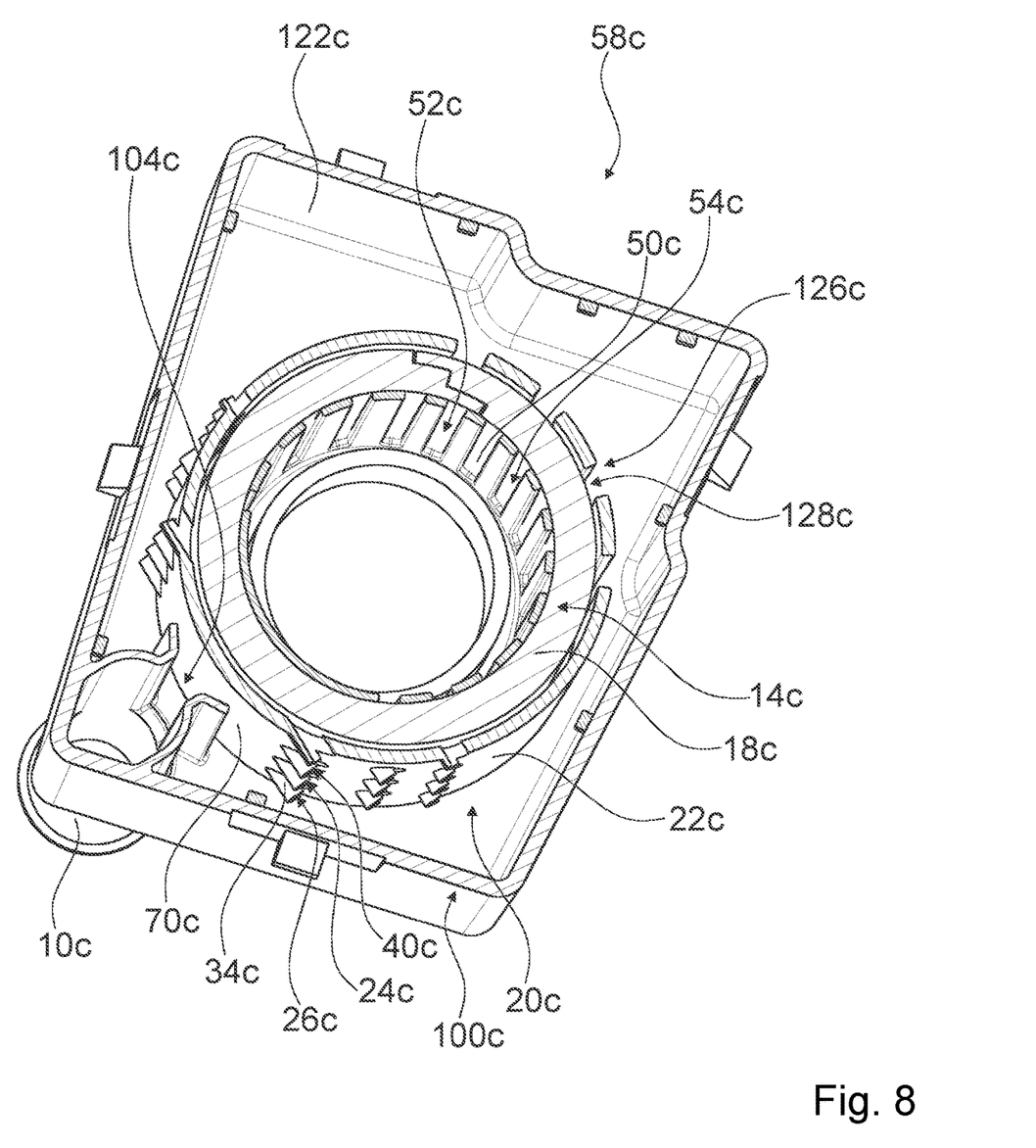
FIG. 8: a schematic sectional view of a second alternative particulate filtration device

FIGS. 6 to 8 show two further embodiments of the invention. The following descriptions and the drawings are essentially limited to the differences between the embodiment examples, although reference can in principle also be made to the drawings and/or the description of the other embodiment examples, in particular of FIGS. 1 to 5, with respect to components with the same designation, in particular with respect to components with the same reference signs. To distinguish the embodiment examples, the letter a is placed after the reference signs of the embodiment example in FIGS. 1 to 5. In the embodiment examples of FIGS. 6 to 8, the letter a is replaced by the letters b and c.

The FIG. 6 shows a schematic perspective outside view of an alternative embodiment of a particulate filtration device 58b. The alternative particulate filtration device 58b comprises a common housing 100b, an inlet 10b and an outlet 12b. The housing 100b comprises a box body 122b and a lid 124b. A flow path 16b extends between the inlet 10b and the outlet 12b. Along the flow path 16b, a gas stream is purified by removing particulates from the gas stream. Furthermore, the alternative particulate filtration device 58b comprises a reception area 102b, which is configured to receive a poppet valve device (not shown) for controlling a blockage of the flow path 16b.

The FIG. 7 shows a schematic perspective view of the alternative particulate filtration device 58b wherein the lid 124b of the housing 100b is removed and which allows a view into the inner workings of the particulate filtration device 58b. The alternative particulate filtration device 58b comprises a prefilter chamber 20b with an inertial filter element 22b. The prefilter chamber 20b comprises a first subchamber 42b which extends between an outer circumference of the inertial filter element 22b and inner walls of the housing 100b. The prefilter chamber 20b comprises a second subchamber 44b which extends between an inner circumference of the inertial filter element 22b and an outer circumference of a filtration medium 18b defining a main filter section 14b of the alternative particulate filtration device 58b. The prefilter chamber comprises two inlets 104b, 106b which are different from the inlet 10b of the particulate filtration device 58b but which are connected to the inlet 10b of the particulate filtration device 58b. Both inlets produce separate mean inflow directions 28b, 28'b. The first subchamber 42b is further divided into two halves 110b, 112b, each of which is connected to one of the two inlets 104b, 106b.

The inertial filter element 22b is at least partly circular. The inertial filter element 22b extends between a top wall (not shown) and a top wall 108b of the housing 100b. The inertial filter element 22b is sealed gas tight and/or leak tight with the top wall 108b and the bottom wall. The prefilter chamber 20b is delimited by the housing 100b and the surface of the filtration medium 18b at the same time forming the outer boundary of the main filter section 14b. The main filter section 14b is circular. The main filter section 14b in the embodiment of FIG. 7 is defined/delimited by the outer surface of the filtration medium 18b, parts of the housing 100b (top- and bottomside) and an inner support wall 50b. The filtration medium 18b contacts the housing top and bottomside in a way that the filtration medium 18b must be passed by the gas stream on the way along the flow path 16b between the inlet 10b and the outlet 12b. The main filter section 14b is encompassed by the inertial filter element 22b. The inertial filter element 22b is spaced apart from the surface of the filtration element 18b/the main filter section 14b. The inertial filter element 22b is held in place by two fixing elements 114b, 116b, each of which is fixed to a holding section 118b, 120b of the housing 100b, respectively.

The inertial filter element 22b comprises perforations 24b, 26b and deflection elements 34b for each perforation 24b, 26b, respectively. The deflection elements 34b protrude from a main body 70b of the inertial filter element 22b in a direction that faces away from the main filter section 14b/the filtration medium 18b. The perforations 24b, 26b are arranged on a surface of the main body 70b of the inertial filter element 22b in staggered rows and columns. The perforations 24b, 26b are arranged on a surface of the main body 70b in quincunx fashion.

The main filter section 14b is delimited by a slitted inner support wall 50b of the particulate filtration device 58b at least on a side 48b of the filtration medium 18b which faces away from the inertial filter element 22b. The slitted support wall 50b comprises several slits 52b, 54b. The slitted support wall 50b is formed in one piece with at least part of the housing 100b. The slitted support wall 50b comprises ribs (not shown) on its surfaces which face towards the inertial filter element 22b, which are configured to engage with the (deformable) material of the filtration medium 18b in order to hold the filtration medium 18b in place. A distance between two neighboring slits 52b, 54b of the slitted inner support wall 50b becomes smaller the further away the slits 52b, 54b are from the inlets 104b, 106b of the prefilter chamber 20b. The slits 52b, 54b are intended to direct the flow path 16b of the gas stream from the inlets 104b, 106b towards the outlet 12b.

Figure 9:
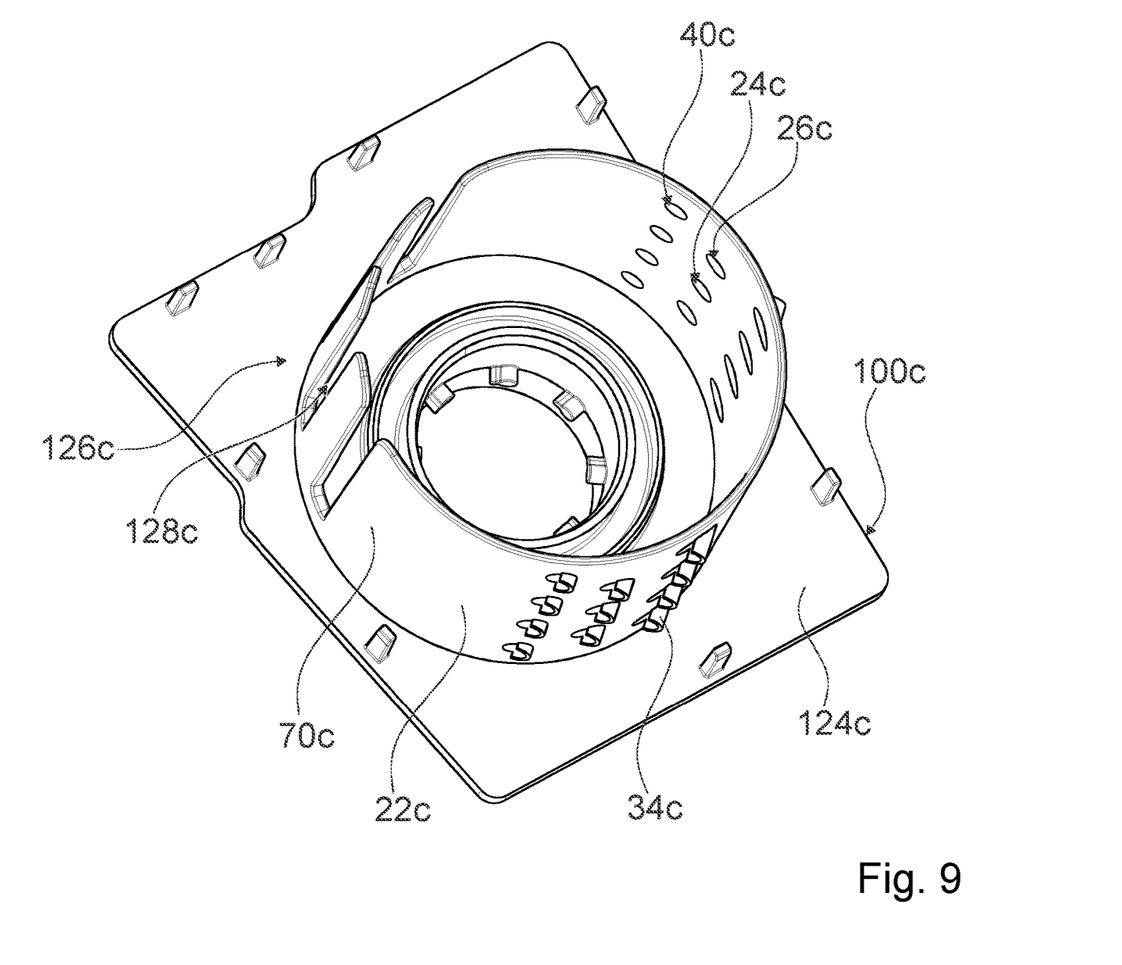
FIG. 9: a schematic perspective view of a lid of the second alternative particulate filtration device.

The FIG. 8 shows a schematic perspective view of a second alternative particulate filtration device 58c wherein a lid 124c (see also FIG. 9) of a housing 100c of the second alternative particulate filtration device 58c is removed. The FIG. 9 shows a schematic perspective view of one part of the housing 100c of the second alternative particulate filtration device 58c. The second alternative particulate filtration device 58c comprises a prefilter chamber 20c that extends between inner walls of the housing 100c and an outer surface of a filtration medium 18c of a main filter section 14c of the second alternative particulate filtration device 58c. A particulate-laden gas stream enters the prefilter chamber 20c via a single inlet 104c of the prefilter chamber 20c, which is flow connected to an inlet 10c of the second alternative particulate filtration device 58c. An inertial filter element 22c of the second alternative particulate filtration device 58c is implemented as one piece with part of the housing 100c. The housing 100c comprises a box body 122c and the lid 124c. In the exemplary embodiment of FIG. 9, the inertial filter element 22c is implemented as one piece with the lid 124c. However, it is also conceivable that the inertial filter element 22c is implemented as one piece with the box body 122c. Thereby a particularly tight connection and simple producibility can advantageously be achieved.

The inertial filter element 22c comprises perforations 24c, 26c with deflection elements 34c. The deflection elements 34c respectively border about 50% of an outline of the respective perforation 24c, 26c. The deflection elements 34c are shaped semitubular. The deflection elements 34c have different protrusion heights from a surface of a main body 70c of the inertial filter element 22c. The further away the deflection elements 34c are from the inlet 104c, the smaller the deflection elements 34c become. Angles between opening planes 40c of perforations 24c, 26c and the corresponding deflection elements 34c become larger the further away the deflection elements 34c are from the inlet 104c. All of the deflection elements 34c of different perforations 24c, 26c are aligned at least substantially parallel to each other. On a side 126c of the inertial filter element 22c, which faces away from the inlet 104c of the prefilter chamber 20c, the perforations 128c are embodied slit-like (see also FIG. 9). The slit-like perforations 128c extend all the way between top- and bottomside of the housing 100c. The slit-like perforations 128c are free from deflection elements 34c. The main filter section 14c and the filtration medium 18c are embodied analogously to FIG. 7, wherein a slitted inner support wall 50c of the particulate filtration device 58c is implemented as one piece with the box body 122c of the housing 100c. The box body 122c and the lid 124c are connectable with each other to form the housing 100c, for example by a form-fit connection or by a substance fit bond.

REFERENCE NUMBERS

10 Inlet
12 Outlet
14 Main filter section
16 Flow path
18 Filtration medium
20 Prefilter chamber
22 Inertial filter element
24 Perforation
26 Perforation
28 Mean inflow direction
30 Mean outflow direction
32 Angle
34 Deflection element
36 Side
38 Side
40 Opening plane
42 First subchamber
44 Second subchamber
46 Direction of Earth's gravity
48 Side
50 Inner support wall
52 Slit
54 Slit
56 Fuel vapor recovery system
58 Particulate filtration device 60 Vehicle
62 Lateral edge
64 Particulates
66 Partial flow path
68 Partial flow path
70 Main body
72 Tab
74 Angle
76 Canister vent solenoid
78 Poppet valve device
80 Poppet
82 Valve seat
84 Magnetic coil
86 Magnetic anchor
88 Valve stem
90 Valve inlet
92 Method step
94 Valve outlet
96 Method step
98 Method step
100 Housing
102 Reception area
104 Inlet
106 Inlet
108 Top wall
110 Half
112 Half
114 Fixing element
116 Fixing element
118 Holding section
120 Holding section
122 Box body
124 Lid
126 Side
128 Perforation
130 Opening

The invention claimed is:

1. A vehicle having a fuel vapor recovery system, the fuel vapor recovery system having a particulate filtration device, the particulate filtration device comprising:
an inlet for an inflow of a gas stream which is particle-laden,
an outlet for an outflow of the gas stream having a reduced particulate load,
a main filter section, which is arranged within a flow path of the gas stream between the inlet and the outlet and which comprises a filtration medium, and
a prefilter chamber, which is arranged upstream of the main filter section and which comprises an inertial filter element, having several perforations,
wherein each of the perforations are arranged within the flow path of the gas stream in such a way that when the flow path of the gas stream is passing through the perforations, an inertial separation of particulates from each flow path of the gas stream is achieved,
wherein each of the perforations are at least sectionally bordered by a deflection element,
wherein the deflection element protrudes from the inertial filter element, and
wherein the deflection element protrudes from a side of the inertial filter element that faces away from an outflow direction of the prefilter chamber.

2. The vehicle according to claim 1, wherein a mean inflow direction of a gas stream into the prefilter chamber and a mean outflow direction of a gas stream out of the prefilter chamber spans an angle of at least 45° and at most 135°.

3. The vehicle according to claim 1, wherein the perforations are arranged within the prefilter chamber in a cascading manner.

4. The vehicle according to claim 1, wherein the deflection element protrudes from a side of the inertial filter element that faces away from the main filter section.

5. The vehicle according to claim 1, wherein the deflection elements border each of the perforations on a side of the perforations that face towards a mean inflow direction of the gas stream.

6. The vehicle according to claim 1, wherein in a top view to each of the perforations perpendicular to an opening plane of the perforations, the deflection elements at least partly cover the perforations.

7. The vehicle according to claim 1,
wherein the inertial filter element divides the prefilter chamber in a first subchamber and a second subchamber, which apart from a connection via the perforations is completely separated from the first subchamber.

8. The vehicle according to claim 7,
wherein at least one of the perforations of the inertial filter element is at least sectionally bordered by a deflection element, which is arranged in a way that the gas stream, when flowing from the first subchamber to the second subchamber undergoes an overall deflection larger than 100°.

9. The vehicle according to claim 1,
wherein in a normal operating state, an inflow direction into the prefilter chamber is non-parallel to the direction of gravity.

10. The vehicle according to claim 1,
wherein in a normal operating state, an outflow direction out of the prefilter chamber is parallel to the direction of gravity.

11. The vehicle according to claim 1,
wherein the inertial filter element has a plate shape.

12. The vehicle according to claim 1,
wherein the inertial filter element is at least partly circular.

13. The vehicle according to claim 12,
wherein the main filter section is at least partly circular and/or wherein the main filter section is at least partly encompassed by the inertial filter element.

14. The vehicle according to claim 13,
wherein the main filter section at least on a side of the filtration medium which faces away from the inertial filter element is delimited by a slitted inner support wall.

15. The vehicle according to claim 14,
wherein a distance between two neighboring slits of the slitted inner support wall becomes smaller the further away the slits are from an inlet of the prefilter chamber.

16. A method for a particulate filtration using a particulate filtration device in a fuel vapor recovery system in a vehicle according to claim 1, wherein an inertial prefiltering of a particulate-laden gas stream is performed before a fine filtration of the gas stream is performed via a filtration medium.

* * * * *